US010124278B2

(12) United States Patent
Anzt et al.

(10) Patent No.: US 10,124,278 B2
(45) Date of Patent: Nov. 13, 2018

(54) FLUID FILTER ARRANGEMENT FOR A MOTOR VEHICLE DRIVE TRAIN

(71) Applicants: GETRAG Getriebe- und Zahnradfabrik Hermann Hagenmeyer GmbH & Cie KG, Untergruppenbach (DE); NTZ Nederland B.V., Rotterdam (NL)

(72) Inventors: Christian Anzt, Oberstenfeld (DE); Castan Reiner, Steinheim (DE); Joeri de Haas, Ter Aar (NL); Willy Schaerlaeckens, Bavel (NL)

(73) Assignees: GETRAG Getriebe- und Zahnradfabrik Hermann Hagenmeyer GmbH & Cie KG, Untergruppenbach (DE); NTZ Nederland B.V., Rotterdam (NL)

( * ) Notice: Subject to any disclaimer, the term of this patent is extended or adjusted under 35 U.S.C. 154(b) by 328 days.

(21) Appl. No.: 14/802,819

(22) Filed: Jul. 17, 2015

(65) Prior Publication Data
US 2016/0023140 A1    Jan. 28, 2016

(30) Foreign Application Priority Data

Jul. 22, 2014   (DE) .................. 10 2014 110 325

(51) Int. Cl.
*B01D 29/90*      (2006.01)
*F01M 11/03*     (2006.01)
(Continued)

(52) U.S. Cl.
CPC ........... *B01D 29/90* (2013.01); *B01D 24/165* (2013.01); *B01D 35/005* (2013.01);
(Continued)

(58) Field of Classification Search
CPC .... B01D 29/90; B01D 35/005; B01D 35/027; B01D 24/165; F02M 2037/228
See application file for complete search history.

(56) References Cited

U.S. PATENT DOCUMENTS 1,941,311 A    12/1933  McLean
6,715,459 B2    4/2004  Rosendahl et al.
(Continued)

FOREIGN PATENT DOCUMENTS

CN    1447013 A     10/2003
CN    101254384 A    9/2008
(Continued)

OTHER PUBLICATIONS

European Search Report dated Apr. 4, 2016 in EP Application No. 15170529.0.
(Continued)

*Primary Examiner* — David C Mellon
*Assistant Examiner* — Liam Royce
(74) *Attorney, Agent, or Firm* — Knobbe Martens Olson & Bear LLP (57) ABSTRACT

Fluid filter arrangement for a motor vehicle drive train. The filter arrangement comprises a filter housing, which has a fluid inlet and a fluid outlet, allowing fluid to flow in one flow direction from the fluid inlet to the fluid outlet. A filter insert is arranged in the filter housing and divides an interior of the filter housing into an inlet region connected to the fluid inlet and an outlet region connected to the fluid outlet. The filter insert has a filter medium for filtering fluid. The filter insert has a perforated plate having a plurality of holes. The holes are arranged ahead of the filter medium in the flow direction. The size of at least some of the holes is adapted so that fluid impinges upon the filter medium at an increased flow velocity.

7 Claims, 4 Drawing Sheets (51) Int. Cl.
*B01D 35/00* (2006.01)
*B01D 35/027* (2006.01)
*B01D 24/16* (2006.01)
*F02M 37/22* (2006.01)

(52) U.S. Cl.
CPC ........... *B01D 35/027* (2013.01); *F01M 11/03* (2013.01); *F02M 2037/228* (2013.01)

(56) References Cited

U.S. PATENT DOCUMENTS

| | | | |
|---|---|---|---|
| 8,182,702 B2* | 5/2012 | Al-Sannaa | B01D 35/02 210/448 |
| 2003/0140887 A1 | 7/2003 | Rosendahl et al. | |
| 2004/0144716 A1* | 7/2004 | Kobayashi | B01D 39/1623 210/508 |
| 2009/0114578 A1 | 5/2009 | Pekarsky et al. | |
| 2010/0147755 A1* | 6/2010 | Dedering | B01D 29/01 210/167.08 |
| 2011/0068065 A1 | 3/2011 | Gardland et al. | |
| 2013/0092319 A1* | 4/2013 | Lynn | A61M 1/3633 156/251 |
| 2013/0118964 A1 | 5/2013 | Dedering | |
| 2014/0075732 A1* | 3/2014 | Matusek | B60K 15/03 29/428 |

FOREIGN PATENT DOCUMENTS

| | | |
|---|---|---|
| CN | 201164752 Y | 12/2008 |
| CN | 101601949 A | 12/2009 |
| DE | 19738067 A1 | 7/1998 |
| DE | 10296703 | 7/2002 |
| DE | 102011117163 | 5/2013 |
| EP | 2133130 | 12/2009 |
| EP | 2364762 A1 | 9/2011 |

OTHER PUBLICATIONS

English Abstract of DE10296703.
Partial EP Search Report dated Dec. 18, 2015 in EP Application No. 15170529.0-1356.

* cited by examiner

FLUID FILTER ARRANGEMENT FOR A MOTOR VEHICLE DRIVE TRAIN

CROSS-REFERENCE TO RELATED APPLICATIONS

This application claims the priority of German patent application DE 10 2014 110 325.4, filed Jul. 22, 2014, content of which is incorporated by reference.

BACKGROUND

The present invention relates to a fluid filter arrangement for a motor vehicle drive train, having a filter housing, which has a fluid inlet and a fluid outlet, allowing fluid to flow in one flow direction from the fluid inlet to the fluid outlet, and having a filter insert, which is arranged in the filter housing and divides an interior of the filter housing into an inlet region connected to the fluid inlet and an outlet region connected to the fluid outlet, wherein the filter insert has a filter medium for filtering fluid.

The present invention furthermore relates to a method for filtering a drive train fluid, in particular by means of a fluid filter arrangement of the type designated above, comprising the step of conveying a fluid through a filter medium, which is arranged in a filter housing.

Transmissions for motor vehicle drive trains generally contain a fluid, such as an oil, which is used for the purpose of lubrication and/or cooling. In addition to bath-type lubrication, in which lubrication and cooling are accomplished by virtue of the fact that rotatable elements of the transmission, such as gearwheels, dip into a fluid sump, injection-type lubrication is also known.

In the widest sense, an injection-type lubrication system contains a fluid supply device, which delivers fluid from the fluid sump and conveys it in a targeted manner to points within the transmission which are to be lubricated and/or cooled. Fluid supply devices of this kind generally have a pump, the suction side of which is connected to the fluid sump.

Another known practice in transmissions for motor vehicle drive trains is to provide hydraulic actuators, which can be used to actuate a clutch arrangement and/or to actuate selector clutches or the like, for example. The hydraulic pressure required for this purpose is produced via a fluid supply device, which is likewise generally equipped with a pump.

Fluid supply devices of the type described above can have pumps which are coupled to an auxiliary drive unit of a drive motor. Here, the speed of the pumps generally corresponds to the speed of the drive motor. However, the practice of driving pumps of this kind independently of the vehicle drive motor, e.g. by means of a respectively dedicated electric motor, by means of which the pump can be driven in one or two directions of rotation, is also known. In the latter case, the pump can also be used as an actuator pump, such that the pressure made available to a hydraulic actuating cylinder or the like on the delivery side of the pump is regulated by means of the speed of the pump. In this case, it is not necessary to arrange a proportional pressure control valve or the like between the pump and the actuating cylinder. This can make the drive train less expensive overall since a hydraulic branch designed in this way does not require any proportional valves, which can only be installed in the assembly environment if cleanliness requirements are increased.

In the case of the abovementioned pumps, a suction side is generally connected to a fluid sump. The fluid sump can be a fluid sump of the transmission but can also be a combined fluid sump of a transmission and of a wet clutch arrangement, as in the case of some dual clutch transmissions for example.

To avoid a situation where the pump draws in contaminants from the fluid sump, the suction side of the pump is generally connected to the fluid sump via a fluid filter arrangement of the type described at the outset, such that a fluid inlet of the fluid filter arrangement is connected to the sump and a fluid outlet of the fluid filter arrangement is connected to a suction side of a pump of a fluid supply device of this kind.

The main flow direction from the fluid inlet to the fluid outlet set up in a filter housing of a fluid filter arrangement of this kind is preferably directed from the bottom up, i.e. against gravity (in the case of use of the motor vehicle drive train and of the fluid filter arrangement as intended). In this case, the fluid can flow vertically upwards or, alternatively, obliquely upwards through the filter medium.

In some operating states of a motor vehicle drive train of this kind, the fluid in the fluid sump may be highly foamed with air or other gases. Particularly when the fluid is conveyed through the filter medium at relatively low flow velocities, there is the possibility that air or another gas will separate out of the fluid underneath the filter medium and agglomerate there to form relatively large bubbles. Low flow velocities can occur particularly when a pump of a fluid supply device is driven purely according to demand, that is to say, for example, by means of an electric motor.

Gas bubbles of this kind (also referred to below as air bubbles) can pass through the filter medium owing to the buoyancy force thereof when certain sizes are reached and can abruptly enter a pump performing a sucking action. This can lead to severe impairment of the hydraulic pressure on the delivery side of a pump, which can have a disadvantageous effect on the controllability of such pressure, especially if the pump is being used as a pump actuator as described above.

Gas bubbles of the type described above can collect underneath the filter medium, especially in those regions through which the flow is generally weaker than in other areas owing to the geometry of the filter housing or the like.

When using a pump as a pump actuator, the volume flow required by the pump during phases in which the pressure is being finely or accurately regulated is relatively low, and therefore it is precisely in such phases that very low flow velocities can occur in the fluid filter arrangement and hence that the risk of air agglomeration is increased. However, it is precisely in these phases that abrupt penetration of an air bubble through the filter medium has particularly disadvantageous effects since the hydraulic pressure on the delivery side of the pump is thereby greatly impaired in the sense of a disturbance variable.

A fluid filter arrangement of the type in question is known from document DE 102 96 703 T5, for example.

SUMMARY

Given the above background situation, it is an object of the invention to indicate an improved fluid filter arrangement and an improved method for filtering a drive train fluid, wherein at least one of the abovementioned disadvantages of the prior art is preferably mitigated or eliminated.

In the case of the fluid filter arrangement mentioned at the outset, the above object is achieved according to one aspect by virtue of the fact that the filter insert has a perforated plate having a plurality of holes, which are arranged ahead of the filter medium in the flow direction, wherein the size of at least some of the holes is adapted so that fluid impinges upon the filter medium at an increased flow velocity.

As regards this aspect, the method according to the invention is consequently distinguished by the step that the fluid is accelerated locally on the inlet side during the filtering operation, with the result that it impinges upon the filter medium at an increased velocity.

Owing to the fact that the fluid impinges upon the filter medium at an increased flow velocity, the risk that air bubbles will form on the underside of the filter medium is reduced. It is thereby possible to reduce the risk that such air bubbles break through the filter medium abruptly during a filtering operation and enter a pump performing a sucking action.

The filter medium is preferably a medium extending generally over an area, e.g. a web-type medium or the like. In this case, the filter medium can have a uniform structure over the area but can also be inherently corrugated, as disclosed in the prior art described above, for example. The filter medium can be a felt-type nonwoven textile containing nylon fibres, polyester fibres or the like. It is self-evident that the filter medium should be temperature-stable, in particular, since the fluid can easily reach temperatures in the region of 150° C. in a drive train.

The holes are preferably arranged in a manner distributed over the filtering area of the filter medium. The number of holes can be in a range of from 6 to 200, in particular in a range of from 20 to 150, particularly preferably in a range of from 40 to 120.

The perforated plate can be a substantially rectangular plate, for example, wherein 2 to 10 holes are arranged one behind the other in one direction and 3 to 25 holes are arranged one behind the other in a direction transverse thereto.

The perforated plate is preferably arranged in such a way that the holes are spaced apart from the filter medium in the flow direction. The spacing is preferably uniform over the area of the filter medium. For example, the spacing between the exit of the hole and the surface of the filter medium can be in a range of from 0.5 mm to 40 mm, in particular in a range of from 1 mm to 30 mm.

According to the first aspect of the invention, the result achieved is consequently that fluid heavily prefoamed with air or a gas can move quickly underneath the filter medium during a filtering operation, preventing air or some other gas from separating out at the underside of the filter medium by virtue of an increased flow velocity.

The object is thus completely achieved according to this aspect of the invention.

In this embodiment, it is preferred if the filter medium is arranged substantially horizontally. In the present case, a horizontal arrangement is understood to mean that the filter medium assumes an angle in a range of from 0° to 45°, preferably an angle of <30°, relative to a horizontal arranged perpendicularly to gravity.

It is furthermore advantageous if the holes each have a cross-sectional area in a range of from 0.1 mm$^2$ to 20 mm$^2$, in particular in a range of from 0.2 mm$^2$ to 7 mm$^2$.

According to another preferred embodiment, the holes are arranged uniformly or in a grid pattern in relation to the filter medium.

According to another preferred embodiment, a cross-sectional area of the holes, as seen over an area of the filter medium, is variable and is in each case chosen in such a way that a flow velocity of the fluid is approximately equal, as seen over the area of the filter medium.

In other words, the assumption is, for example, that the fluid inlet and the fluid outlet are local and, in general, have a smaller area than the filter medium. Within the filter housing, the flow profile obtained, depending on the geometry of the filter housing and the arrangement of the filter insert in relation to the horizontal, can allow a different velocity of flow through the filter medium in some regions than in other regions. The cross-sectional area of the holes can now preferably be chosen in such a way that the flow velocity of the fluid, as seen over the area of the filter medium, becomes approximately equal. This can entail that the cross-sectional area of the holes is made larger, in relative terms, in the regions which would lead to a relatively low flow velocity through the filter medium owing to the geometry of the housing or other boundary conditions. In those regions in which the flow velocity is in any case relatively high, on the other hand, owing to the geometry of the housing etc., the cross-sectional area of the holes can be made smaller in relative terms.

Overall, this measure ensures that the flow through the filter medium takes place at a substantially identical flow velocity, irrespective of geometry or other boundary conditions, such that regions underneath the filter medium with flow velocities that are very low in relative terms are avoided. Consequently, it is possible to ensure that the risk of air bubble accumulation in such regions is significantly reduced.

In order to achieve a largely uniform flow velocity, as seen over the area of the filter medium, it is also possible, as an alternative or in addition to the abovementioned measures, to make the density of the holes variable, as seen over the area of the filter medium, that is to say, for example, to choose a larger number of holes in those regions of the filter medium where the velocity could be low due to the design than in those regions in which the flow velocity is in any case high in relative terms owing to the design. All the following references to different cross-sectional areas of holes in the perforated plate should consequently refer equally to different hole densities (number of holes per unit area of the filter medium).

According to another preferred embodiment, the filter housing has a longitudinal extent with a first longitudinal end and a second longitudinal end, wherein the fluid inlet is formed in the region of the first longitudinal end, wherein the fluid outlet is formed in the region of the second longitudinal end and wherein the cross-sectional area of at least some of the holes is greater in the region of the second longitudinal end than that of holes in the region of the first longitudinal end.

According to another preferred embodiment, the filter housing has a transverse extent with a first transverse side and a second transverse side, wherein the fluid inlet and/or the fluid outlet is/are formed in the region of the first transverse side and wherein the cross-sectional area of at least some of the holes is greater in the region of the second transverse side than that of holes in the region of the first transverse side.

By means of the measures described above, it is preferably possible to ensure that the flow through the filter medium during operation takes place at a largely uniform flow velocity.

According to another preferred embodiment, which forms another aspect of the invention, which is substantially independent of the first aspect, the filter insert has a waffle cell element, which forms a plurality of waffle cells, which extend from the filter medium to the inlet region.

Consequently, the filter medium has a plurality of waffle cells on the suction side, with the result that the filter medium is of waffle or coffer-ceiling-type design on its underside owing to the waffle cell element.

The shape of the waffle cells can be square but can also be rectangular, circular, polygonal or of some other shape.

Starting from the surface of the filter medium, the waffle cells each have an extent counter to the flow direction which can be in a range of from 0.5 mm to 30 mm, in particular in a range of from 1 mm to 20 mm.

By means of the waffle cells formed in this way, it is possible to ensure that air bubbles which may collect on the underside of the filter medium in filtering operation cannot exceed certain sizes, this size being a function, in particular, of the shape and/or volume of the waffle cells.

According to the second aspect of the invention, the method according to the invention includes the step of dividing the fluid in a space situated ahead of the filter medium in the flow direction into a plurality of individual flows, which are delimited with respect to one another by walls of waffle cells.

In this case, each individual flow can form a maximum buildup volume between the walls of the respective waffle cells underneath the filter medium, said volume generally also limiting the maximum size of an air bubble which could pass abruptly through the filter medium. By means of this measure too, it is consequently possible to ensure mitigation of the risk that air bubbles of a significant size will break abruptly through the filter medium, which could have a negative effect on the adjustability of the hydraulic pressure on the delivery side of a connected pump.

In the case of the fluid filter arrangement according to the second aspect, it is preferred if this aspect is combined with the first aspect.

It is furthermore preferred here if the waffle cell element is arranged between the filter medium and the perforated plate, as seen in the flow direction.

It is furthermore preferred here if at least some of the waffle cells are assigned precisely one hole in the perforated plate.

A synergistic effect is thereby obtained between the invention according to the first aspect and the invention according to the second aspect.

According to another embodiment, which is preferred overall, which combines the two aspects, at least some of the waffle cells, together with the perforated plate, in each case form a waffle cell chamber.

Consequently, the waffle cell chamber is delimited, on the one hand, by the perforated plate and, on the other hand, by the filter medium and laterally by walls of the waffle cells. Fluid can preferably penetrate into the waffle cell chamber exclusively through one or more holes in the perforated plate and can preferably be discharged from the waffle cell chamber exclusively through the filter medium, thus preferably largely avoiding exchange of fluid between adjacent waffle cell chambers and preferably completely excluding it. At any event, the waffle cell chambers are designed in such a way that a significantly larger proportion of the fluid fed in via a hole is discharged via the filter medium during filter operation than is discharged in a transverse direction towards an adjacent or a plurality of adjacent waffle cell chambers.

It is furthermore preferred overall if at least some of the waffle cells or waffle cell chambers have a volume which is in a range of from 10 mm$^3$ to 5000 mm$^3$.

Overall, at least one of the advantages described below is preferably achieved by means of the present invention. Particularly when the filter medium has a slope angle of greater than 0° to the horizontal in use as intended, but is still "substantially horizontal", it could be the case in the prior art that air separated out rose towards a region of poor flow on the underside of the filter medium owing to buoyancy forces and collected there to form relatively large volumes. According to the invention, this problem can preferably be mitigated. Overall, it is possible to ensure that fluid highly foamed with air moves so quickly underneath the filter medium that no air or less air can separate out and/or that air bubbles which form cannot exceed a certain size. It is furthermore preferably possible to ensure that oil within the filter housing is directed selectively into regions with low flow velocities in terms of design in order significantly to reduce the risk of air agglomeration there.

In general, it is also conceivable to provide a waffle cell element on the upper side of the filter medium, especially if the flow through the filter medium is from the top down. Such waffle cell elements can furthermore also be provided on the upper and lower sides of the filter medium.

When the fluid filter arrangement is used in a motor vehicle drive train, especially in a pump actuator arrangement for clutch pressure regulation, or with other hydraulic actuators, the invention provides particular advantages. This is because the problems described at the outset can preferably be mitigated on the basis of the comparatively low intake volume flows with such pump actuators and other actuators.

It is self-evident that the features mentioned above and those which remain to be explained below can be used not only in the respectively indicated combination but also in other combinations or in isolation without exceeding the scope of the present invention.

BRIEF DESCRIPTION OF THE SEVERAL VIEWS OF THE DRAWING

Illustrative embodiments of the invention are shown in the drawing and are explained in greater detail in the following description. In the drawing.

Figure 1:
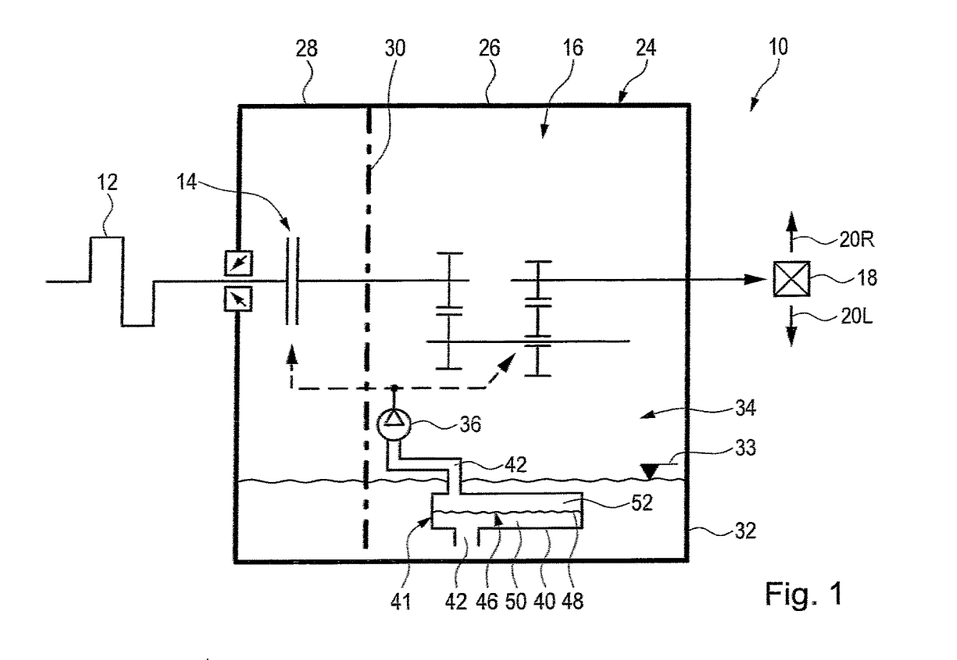
FIG. 1 shows a schematic illustration of a motor vehicle drive train having an embodiment of a fluid filter arrangement according to the invention.

A drive train for a motor vehicle is illustrated in schematic form in FIG. 1 and is denoted overall by 10. The drive train 10 comprises a drive motor 12, such as an internal combustion engine or a hybrid drive unit. The drive train 10 furthermore has a clutch arrangement 14, the input of which is connected to the drive motor 12 and the output of which is connected to a transmission 16. The transmission 16 can be designed as a stepped transmission, in particular of layshaft construction, but can also be designed as a converter-type automatic transmission, as a continuously variable transmission or the like. An output of the transmission 16 is connected to a differential 18, by means of which motive power is distributed to driven wheels 20L, 20R.

A housing arrangement 24 comprises a transmission housing 26 and a clutch housing 28. The transmission housing 26 and the clutch housing 28 can be separated spatially and fluidically from one another by a dividing wall 30. However, such a dividing wall 30 is optional. On the other hand, the transmission housing 26 and the clutch housing 28 can also have a common fluid sump 32, the sump level of which is indicated at 33 in FIG. 1. In the case of the provision of a dividing wall 30, it is also possible for different fluids to be held in the transmission housing 26 and in the clutch housing 28. However, a common fluid sump 32 is preferably provided in the housing arrangement 24, wherein the fluid can be an automatic transmission fluid, for example.

A fluid supply device 34 is assigned to the clutch arrangement 14 and/or to the transmission 16. The fluid supply device 34 comprises a pump arrangement 36, by means of which fluid is provided for the clutch arrangement 14 and/or the transmission 16. The fluid supply device 34 can be designed to make available fluid for lubrication and/or cooling purposes. However, the fluid supply device 34 is preferably designed, by means of the pump arrangement 36, to supply a fluid pressure for actuating hydraulic actuators, which can be used to actuate the clutch arrangement 14 and/or selector clutches of the transmission 16, for example. The transmission 16 can be a dual clutch transmission. The clutch arrangement 14 can be a single clutch but can also be a dual clutch arrangement.

The pump arrangement 36 has a pressure port (not designated specifically), which is connected to the transmission 16 and/or the clutch arrangement 14, and a suction port, which is connected to the fluid sump 32 via a fluid filter arrangement 40.

The fluid filter arrangement 40 is used to filter the fluid drawn in by the pump arrangement 36 before it enters the pump arrangement 36 and/or actuator elements or the like.

The fluid filter arrangement 40 comprises a filter housing 41, on which a fluid inlet 42 and a fluid outlet 44 are formed. The fluid inlet 42 is connected directly to the fluid sump 32. The fluid outlet 44 is connected to the suction port of the pump arrangement 36. A filter insert 46 is inserted in the filter housing 41. The filter insert 46 comprises a filter medium 48, which is a felt-type, web-type or some other filter structure, in particular from a nonwoven textile which contains nylon fibres, polyester fibres or similar. The filter medium is preferably a screen made from woven metal.

The filter insert 46 divides the interior of the filter housing 41 into an inlet region 50 and an outlet region 52.

The filter insert 46 furthermore comprises a perforated plate of the kind explained below with reference to FIGS. 2 to 3, and/or a waffle cell element of the kind explained especially with reference to FIG. 4.

Further embodiments of fluid filter arrangements, which can correspond in general in terms of construction and operation to the fluid filter arrangement 40 described with reference to FIG. 1, are explained below. Identical elements are therefore denoted by identical reference signs. It is essentially the differences which are explained below.

Figures 2, 2A:
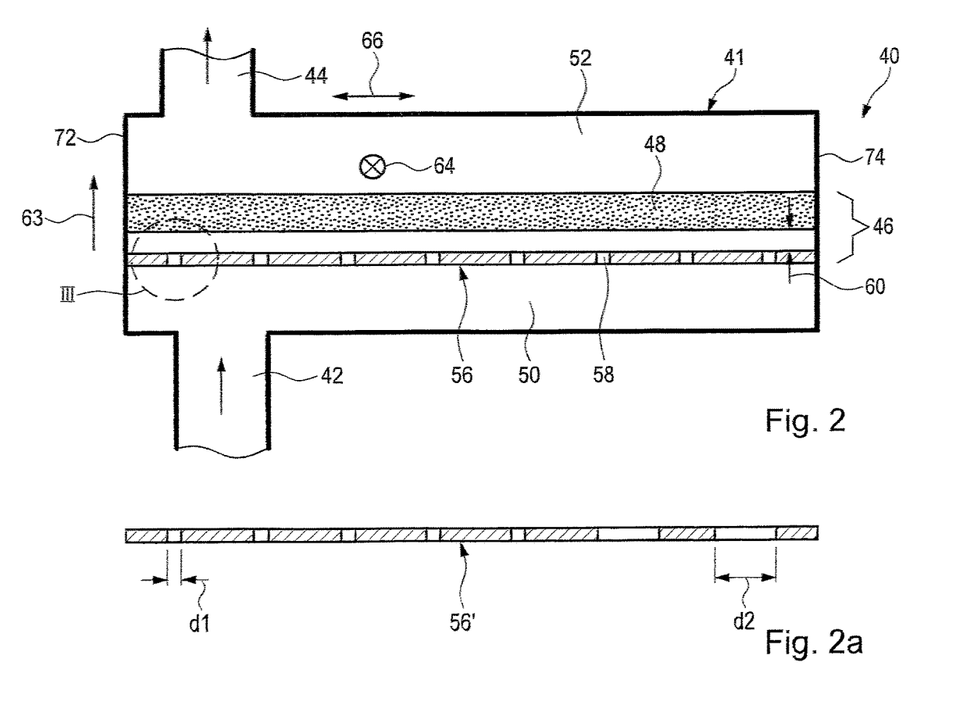
FIG. 2 shows a schematic sectional view of another embodiment of a fluid filter arrangement according to the invention.
FIG. 2a shows an alternative embodiment of a perforated plate for the fluid filter arrangement in FIG. 2.
Figure 3:
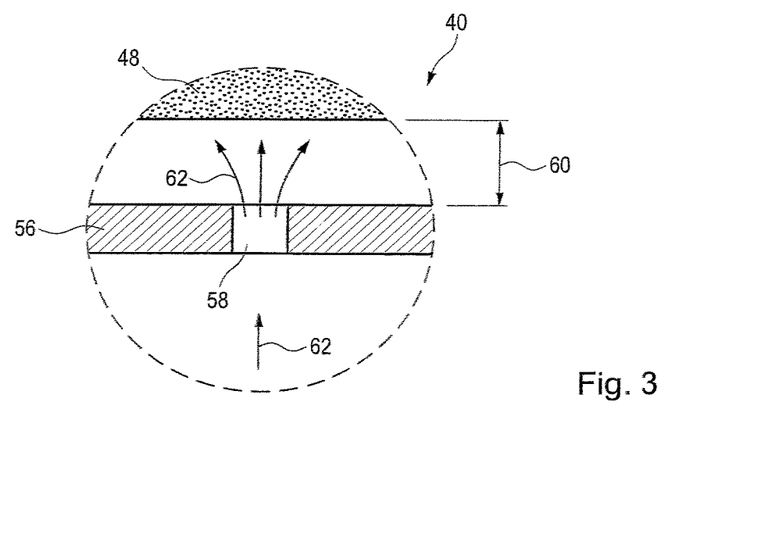
FIG. 3 shows an illustration of a detail III from FIG. 2.

A fluid filter arrangement 40 according to a first aspect of the present invention is shown in FIGS. 2, 2*a* and 3. In this fluid filter arrangement 40, the filter insert 46 comprises a perforated plate 56, which has a plurality of holes 58 arranged in a manner distributed over the area of the perforated plate 56. The perforated plate 56 is arranged with a spacing 60 with respect to the filter medium 48, wherein the spacing 60 is preferably greater than 0 mm and can be in a range of from 0.5 mm to 40 mm, in particular in a range of from 1 mm to 30 mm, for example.

The filter insert 46 is mounted in the filter housing 41 in such a way that it is aligned substantially horizontally, i.e. in an angular range of ±20° with respect to a horizontal. Moreover, the fluid inlet 42 and the fluid outlet 44 are arranged in such a way that fluid drawn in from the fluid sump 32 flows through the filter insert 46 from the bottom up, i.e. against gravity. The flow direction thereby established is denoted by 63 in FIG. 2. As seen in the flow direction 63, the perforated plate 56 is arranged ahead of the filter medium 48.

FIG. 3 shows an enlarged illustration of a detail III of FIG. 2. It can be seen that fluid drawn in on the suction side of the perforated plate 56 is forced through the holes 58, which, in the manner of an orifice, ensure that the flow velocity of the fluid increases, with the result that it impinges upon the filter medium 48 at an increased velocity. It is thereby possible to ensure a reduction in the risk that the air bubbles separate out on the underside of the filter medium 48, something that can occur owing to a low flow velocity, for example. In this case, the holes 58 can each be designed as restriction devices in the manner of an orifice or of a nozzle.

The number of holes 58 in the perforated plate 56 can be in a range of from 6 to 200. The holes are preferably arranged in a manner distributed uniformly over the area of the perforated plate 56. In particular, this results in a grid-shaped arrangement of the holes 58 in a longitudinal extent 64 and in a transverse extent 66.

The filter insert 46 has a first longitudinal end and a second longitudinal end, wherein said longitudinal ends are not shown in FIGS. 2, 2*a* and 3 since they are not in the plane of the drawing. The filter insert 46 furthermore has a first transverse side 72 and a second transverse side 74.

In the present case, the fluid inlet 42 and the fluid outlet 44 are arranged in the region of the first transverse side 72. The holes 58 can all have a standard cross-sectional area. However, it is also possible to design the holes with different cross-sectional areas, as seen over the area of the perforated plate 56, as indicated in FIG. 2*a* by different diameters d1 and d2, namely for a modified shape of a perforated plate 56'. In particular, it is possible to design the holes with a larger cross-sectional area in those regions in which the flow velocity would be lower in relative terms owing to the other boundary conditions of the design. In the case of FIG. 2, this could be the region adjacent to the second transverse side 74, for example. Consequently, the holes in this region in the case of the perforated plate 56' in FIG. 2*a* are designed with a larger diameter d2 than the holes which are arranged in the region of the first transverse side 72 (see d1).

It is likewise also possible, as an alternative or in addition, to configure the cross-sectional area of the holes differently as seen in the longitudinal extent 64. If the fluid inlet 42 and/or the fluid outlet 44 are formed in the region of a first longitudinal end, for example, the holes could be designed with a larger cross section in the region of a second longitudinal end.

By means of this measure, it is possible to ensure, if appropriate, that the flow velocity of the fluid as it impinges on the filter medium 48 is rendered substantially uniform as seen over the area of the filter medium 48. This can contribute to the avoidance of regions in which fluid impinges upon the filter medium 48 at very low flow velocities, which could lead to the formation of air bubbles on the underside of the filter medium 48.

Figure 4:
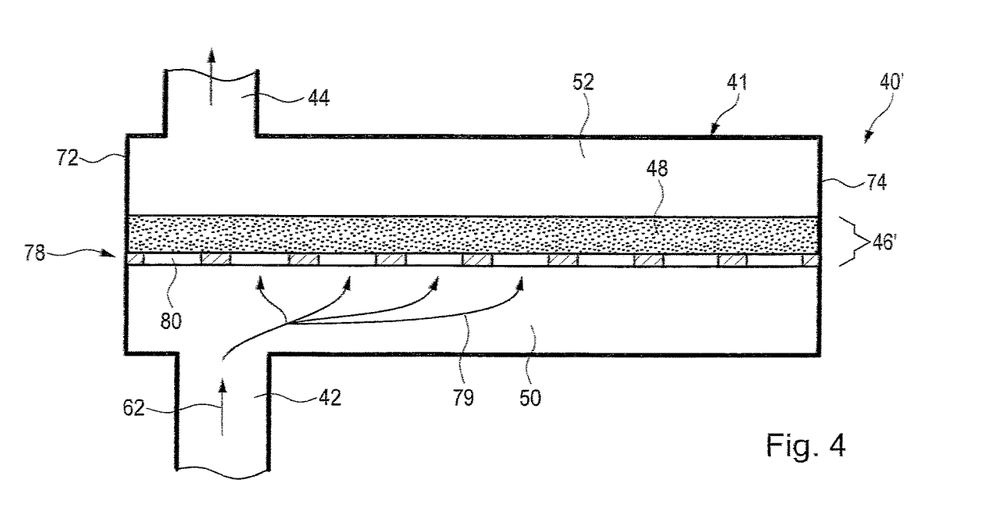
FIG. 4 shows an illustration, comparable to FIG. 2, of another embodiment of a fluid filter arrangement according to the invention.

Another fluid filter arrangement 40' according to a second aspect of the present invention is shown in FIG. 4. In this case, a waffle cell element 78 formed on the underside of the filter medium 48 forms a plurality of waffle cells 80, which extend from the filter medium 48 towards the suction side, i.e. towards the inlet region 50. The volume flow of the fluid 62 is thereby divided into a plurality of individual flows 79 across the individual waffle cells 80. Here, the waffle cells 80 can prevent air bubbles from drifting in a direction transverse to the flow direction 63 on the underside of the filter medium 48. Furthermore, they may prevent the formation of air bubbles with a size greater than the volume of the respective waffle cells 80. The waffle cells 80 preferably extend directly from the filter medium 48 in the direction of the inlet region 50, with the result that the filter insert 46' thus formed is designed like a coffer ceiling from the underside. The waffle cell element could also be referred to as a "coffer element". The waffle cell element 78 can also have corresponding waffle cells on the upper side of the filter medium 48, although this is not shown in FIG. 4. The filter medium 48 and the waffle cell element 78 can be produced in advance, such that the filter medium 48 and the waffle cell element 78 can be mounted as a single part in the filter housing 41.

In the above embodiments, the waffle cell element 78 and the perforated plate 56 can each be produced from plastic. The filter housing 41 can also be produced from plastic.

Figure 5:
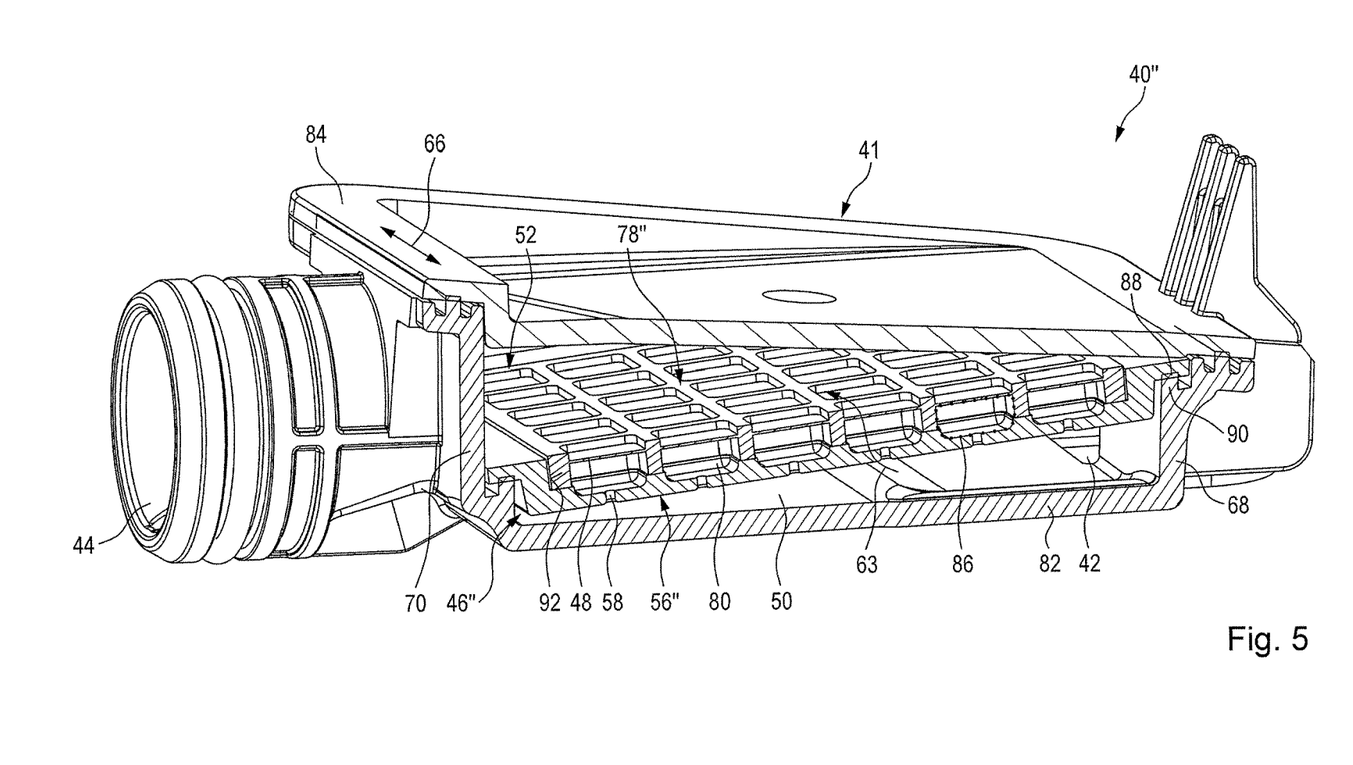
FIG. 5 shows a perspective illustration, sectioned in a longitudinal direction, of another embodiment of a fluid filter arrangement according to the invention.
Figure 6:
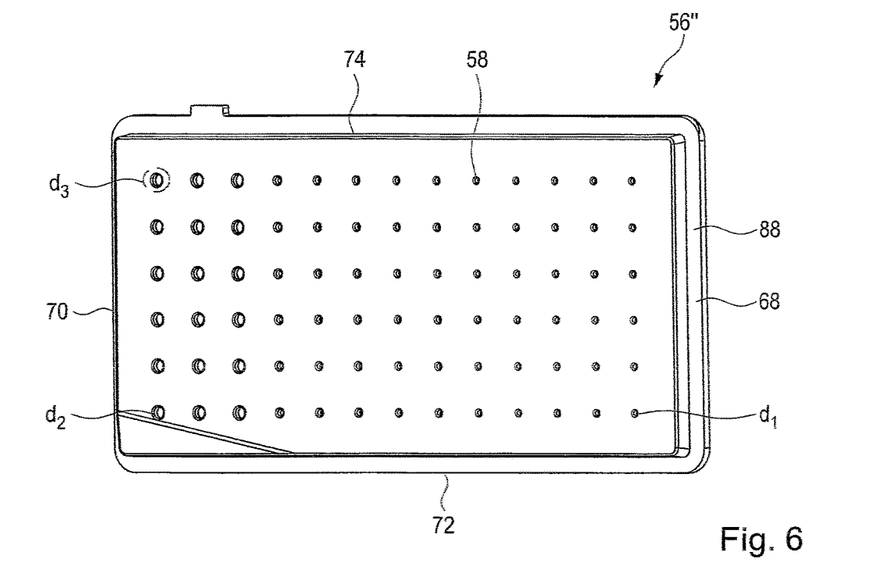
FIG. 6 shows a perspective illustration of a perforated plate of the fluid filter arrangement in FIG. 5.
Figure 7:
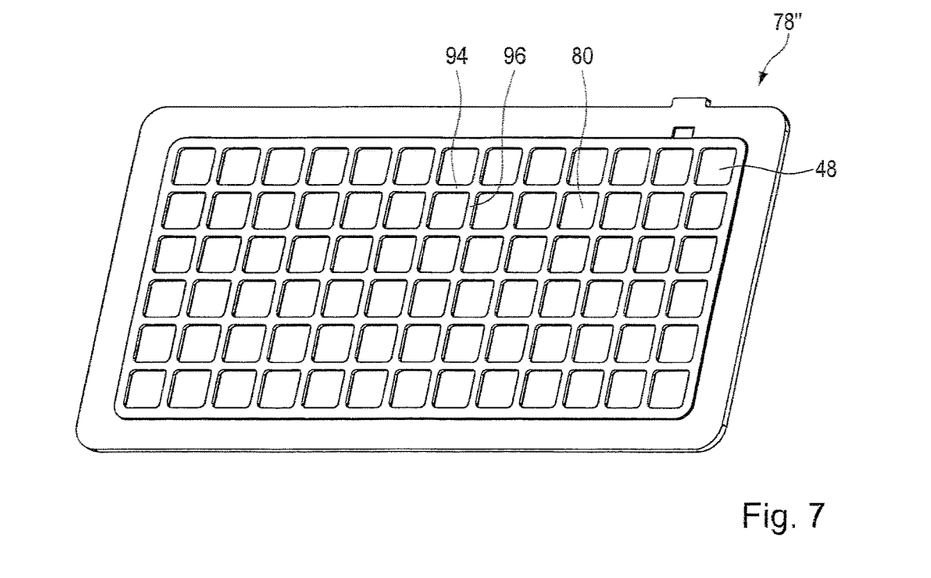
FIG. 7 shows a perspective illustration of a waffle cell element of the fluid filter arrangement in FIG. 5.

In FIGS. 5 to 7 below, another embodiment of a fluid filter arrangement 40" is shown, said arrangement combining the first and the second aspect of the invention. The construction and operation of fluid filter arrangement 40" therefore correspond in combination to the fluid filter arrangements described above. Identical elements are therefore denoted by the same reference signs. It is essentially the differences which are explained below.

In fluid filter arrangement 40", the filter housing 41 has a lower shell 82 and an upper shell 84. The filter insert 46 is connected to the lower shell 82 in a sealed manner at its circumference. The filter insert 46 is installed at an angle in the filter housing 41, namely at an angle to a transverse axis, with the result that the filter insert 46 is at a higher level in the region of a first longitudinal end 68 than in a region of a second longitudinal end 70. The fluid inlet 42 is formed in the region of the first longitudinal end 68. The fluid outlet 44 is formed in the region of the second longitudinal end 70. Owing to the sloping arrangement of the filter insert 46, the longitudinal axes of the fluid inlet 42 and the fluid outlet 44 can be concentric with one another or at least lie close to one another.

In the case of filter insert 46", the perforated plate 56" and the waffle cell element 78" are combined in such a way that respective waffle cell chambers 86 are formed. The perforated plate 56" is arranged ahead of the waffle cell element 78", as seen in flow direction 63, wherein each waffle cell 80 or each waffle cell chamber 86 is preferably assigned a hole 58 in the perforated plate 56". In other words, fluid flows from the inlet side through an associated hole into a respective waffle cell chamber 86, which is delimited by the perforated plate 56", by sidewalls of the waffle cells 80 of the waffle cell element 78 and by the filter medium 48. The volume of the waffle cell chambers can be in a range of from 50 mm$^3$ to 500 mm$^3$. By virtue of the measure that the waffle cell chambers 86, apart from the fluid-supplying holes 58, are each closed, it is not possible for air bubbles larger than allowed by the volume of the respective waffle cell chambers 86 to form on the underside of the filter medium 48. Drifting of air bubbles against gravity, i.e. obliquely upwards from the second longitudinal end 70 towards the first longitudinal end 68, can furthermore be prevented.

Perforated plate 56" has a circumferential sealing flange 88, which rests on a sealing land 90 of the lower shell 82 of the filter housing 41. The sealing flange 88 and the sealing land 90 can be connected to one another by fastening means, but can also be adhesively bonded or thermoplastically welded. The lower shell 82 and the upper shell 84 can be connected to one another in the same way.

On the opposite side from the side shown in FIG. 6, the perforated plate 56" has a receptacle 92 for the insertion of the waffle cell element 78", such that the waffle cell element can be inserted flush into the perforated plate 56", as shown in FIG. 5. Projections (not designated specifically) can ensure correct alignment. In this case, the perforated plate 56" can have holes with a smaller diameter d1 in the region of the first longitudinal end 68, i.e. close to the fluid inlet 42, than the holes which are arranged adjacent to the second longitudinal end 70 (indicated by d2). If appropriate, there can also be a gradual change in diameter in the direction of the transverse extent, as indicated by d3 in FIG. 6. The cross-sectional areas of the holes 58 are preferably chosen in such a way that a flow velocity of the fluid is approximately equal, as seen over the area of the filter medium 48.

To form the waffle cells 80, the waffle cell element 78" has a plurality of longitudinal ridges 94 and a plurality of transverse ridges 96, which intersect one another and in this way form the waffle cell structure. The filter medium 48 is preferably integrated into the waffle cell element 78", as also shown in FIG. 5. FIG. 5 furthermore shows that the waffle cell structure can also continue on the upper side (i.e. towards the fluid outlet 44). This can simplify pre-mounting of the filter medium 48 on the waffle cell element 78" but also allows operation of the fluid filter arrangement 40" in the opposite flow direction, if appropriate.

What is claimed is:

1. A fluid filter arrangement for a motor vehicle drive train, having
    a filter housing, which has a fluid inlet and a fluid outlet, the fluid inlet connected to a fluid sump of a transmission of the motor vehicle, the fluid outlet connected to a suction side of a pump, thereby allowing fluid to flow in one flow direction from the fluid inlet to the fluid outlet,
    a filter insert, which is arranged in the filter housing and divides an interior of the filter housing into an inlet region connected to the fluid inlet and an outlet region connected to the fluid outlet, wherein the filter insert has a filter medium for filtering fluid,
    wherein the filter insert has a perforated plate having a plurality of holes arranged in a grid having a plurality of rows and a plurality of columns, the perforated plate being disposed between the inlet region and the filter medium, the fluid inlet disposed at a first end of the perforated plate, each of the plurality of rows extending longitudinally away from the first end to an opposite end of the perforated plate,
    wherein the filter medium is arranged substantially horizontally,
    wherein the fluid inlet and the fluid outlet each have a smaller area than the filter medium,
    wherein the cross-sectional area of the holes over an area of the filter medium is variable, and wherein the cross-sectional area of each hole increases relative to a hole disposed in a row or column closer to the fluid inlet.

2. The fluid filter arrangement according to claim 1, wherein each of the plurality of holes has a cross-sectional area in a range of from 0.1 mm$^2$ to 20 mm$^2$.

3. The fluid filter arrangement according to claim 1, wherein the filter housing has a longitudinal extent with a first longitudinal end and a second longitudinal end, wherein the fluid inlet is formed in a region of the first longitudinal end, wherein the fluid outlet is formed in a region of the second longitudinal end and wherein the cross-sectional area of at least some of the holes is greater in the region of the second longitudinal end than that of holes in the region of the first longitudinal end.

4. The fluid filter arrangement according to claim 1, wherein the filter insert has a waffle cell element, which forms a plurality of waffle cells, which extend from the filter medium to the inlet region.

5. The fluid filter arrangement according to claim 4, wherein at least some of the waffle cells are assigned precisely one hole in the perforated plate.

6. The fluid filter arrangement according to claim 4, wherein at least some of the waffle cells, together with the perforated plate, form a waffle cell chamber.

7. The fluid filter arrangement according to claim 4, wherein at least some of the waffle cells have a volume which is in a range of from 10 mm$^3$ to 5000 mm$^3$.

* * * * *